(12) United States Patent
Hisatomi et al.

(10) Patent No.: US 7,257,318 B2
(45) Date of Patent: Aug. 14, 2007

(54) INFORMATION RECORDING/REPRODUCING APPARATUS AND METHOD OF COORDINATELY PROCESSING PIECES OF ASPECT RATIO INFORMATION

(75) Inventors: Shuichi Hisatomi, Fuchu (JP); Mitsunori Omokawa, Kawasaki (JP); Tomoaki Kurano, Yokohama (JP); Takahiro Seita, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1215 days.

(21) Appl. No.: 10/082,355

(22) Filed: Feb. 26, 2002

(65) Prior Publication Data
US 2002/0159766 A1 Oct. 31, 2002

(30) Foreign Application Priority Data
Feb. 26, 2001 (JP) ............................. 2001-050456

(51) Int. Cl.
*H04N 5/91* (2006.01)
*H04N 7/01* (2006.01)

(52) U.S. Cl. ..................... 386/131; 386/68; 386/111

(58) Field of Classification Search ............... 386/131, 386/94, 68, 111; 369/47.31
See application file for complete search history.

(56) References Cited

U.S. PATENT DOCUMENTS
6,272,286 B1 * 8/2001 Asada et al. ................ 386/126

FOREIGN PATENT DOCUMENTS
JP 2001-86444 3/2001
JP 2001-86466 3/2001

OTHER PUBLICATIONS
Japanese Office Action, dated Jun. 22, 2004 for Patent Application No. 2001-050456.

\* cited by examiner

*Primary Examiner*—Thai Q. Tran
*Assistant Examiner*—Girumsew Wendmagegn
(74) *Attorney, Agent, or Firm*—Pillsbury Winthrop Shaw Pittman, LLP (57) ABSTRACT

The aspect ratio information of an input video signal is detected and rewritten in such a way that the contents of the aspect ratio information of RDI located at the head of each video object unit and the contents of the aspect ratio information in the sequence header of the compressed video data in the VOBU to which the RDI belongs are coordinated.

4 Claims, 10 Drawing Sheets

| RDI_GI | Real time data and general information |
|---|---|
| DCI_CCI | Display control information and copy control information |
| MNFI | Manufacturer information |

FIG. 3B

| Reserved | |
|---|---|
| VOBU_S_RTM | VOBU presentation start time |
| Reserved | |
| VOBU_REC_TM | VOBU recording time |

FIG. 3C

| DCI : display control information ||||
|---|---|---|---|
| Aspect ratio 4b | Subtitling mode 2b | Reserved 1b | Film camera mode 1b |

FIG. 3D

| CCI : copy control information ||||
|---|---|---|---|
| CGMS 2b | APSTB 2b | Source 1b | Reserved 3b |

| CGMS 7, 8 | Definition | Recording rule |
|---|---|---|
| 0, 0 | Copying authorized unconditionally | CGMS of recording medium is recorded as (0, 0) |
| 0, 1 | Not in use | ... |
| 1, 0 | Copying authorized in a generation | CGMS of recording medium is recorded as (1, 1) |
| 1, 1 | Copying prohibited | Nothing is recorded |

FIG. 5C

| Word 0 | Definition |
|---|---|
| 0, 0 | No signal and information for image with aspect ratio of 4:3 |
| 0, 1 | Squeeze signal for image with aspect ratio of 16:9 |
| 1, 0 | Letter box signal with aspect ratio of 14:3 |
| 1, 1 | Not in use at the moment |

INFORMATION RECORDING/REPRODUCING APPARATUS AND METHOD OF COORDINATELY PROCESSING PIECES OF ASPECT RATIO INFORMATION

CROSS-REFERENCE TO RELATED APPLICATIONS

This application is based upon and claims the benefit of priority from the prior Japanese Patent Application No. 2001-050456, filed Feb. 26, 2001, the entire contents of which are incorporated herein by reference.

BACKGROUND OF THE INVENTION

1. Field of the Invention

This invention relates to a recording/reproducing apparatus provided with a functional feature of coordinately processing restrictive information such as aspect ratio information including small units of data and larger units of data containing such small units.

This invention may typically be applicable to a recording/reproducing apparatus such as one adapted to use a DVD (digital versatile disk), one comprising a hard disk or a built-in large capacity semiconductor memory, or one adapted to simultaneously use a hard disk and a removable DVD, or similar, storage medium.

2. Description of the Related Art

In recent years, in the technology of image compression, a DVD Standard employing both the MPEG 2 (Moving Image Coding Expert Group) System that is currently used as an international standard and the AC3 Audio Compression System has been proposed.

This standard is adapted to support the MPEG 2 System for moving image compression and also the AC3 Audio Compression System and the MPEG Audio Compression System for audio compression. It is also adapted to handle sub image data obtained by run length compression of bit map data for superimposition in movies and karaoke videos. This standard also provides addition of control data (navi-pack) for special reproduction operations, such as fast forwarding and fast rewinding in reproducing apparatuses. Furthermore, this standard is also adapted to support the standards for ISO9660 and micro UDF.

Additionally, the standard for DVD-RAMs (with a storage capacity of about 4.7 GB) has been completed for the media and DVD-RAM drives have been popularly marketed as peripheral devices of computers.

Still additionally, the standard for RTR (real time recording)-RAMs which is a standard allowing DVD videos to record/reproduce information on a real time bases has been almost completed and the verifying operation will soon be over. This standard is based on the standard for currently marketed DVD videos. Efforts for providing a standard for file systems corresponding to such RTR-DVDs are currently being made.

Meanwhile, systems for recording/reproducing broadcast signals by utilizing a hard disk drive (HDD) built in a recording/reproducing apparatus are being discussed currently. Data with a volume more than 100 G bytes can be stored by means of a hard disk drive.

Along with the development of image compression technology, efforts are being paid for developing recording/reproducing apparatus that are adapted to effectively utilize information storage media (DVDs, hard disks, semiconductor memories, etc.) for the purpose of recording broadcast signals.

In a possible mode of utilization of such an apparatus, a signal of a broadcast program (or a signal reproduced from some other recording medium) is input to a recording/reproducing apparatus, which converts the program signal into a predetermined format and stores it in a recording medium. Such recording operations will be carried out in preset intermittent program recording time slots. A number of programs will be temporarily stored in a built-in storage medium (hard disk). Then, different programs will be combined and edited by cutting off parts of them.

In such a mode of utilization, however, television programs with different aspect ratios may be arranged.

However, the mutual relationship between the aspect ratio information defined for the format of DVD-RAM and the aspect ratio information defined for the MPEG format is not specifically defined in apparatuses adapted to use a DVD-RAM. This means that, if aspect ratio information is contained in the management information (RDI pack to be used for navigation) added in the form of a video object units defined for the format of DVD-RAM, it may be different from the aspect ratio information in the video sequence header. When such a contradiction exists, the right aspect ratio may not be determined for a video reproducing operation and the information recording/reproducing apparatus may operate in a wrong way. Additionally, a wrong aspect ratio may be selected for a video reproducing operation.

BRIEF SUMMARY OF THE INVENTION

An embodiment of the present invention is intended to processing the contents of the aspect ratio information of a second signal according to contents of the aspect ratio information of a first signal, and provide a method of coordinately processing pieces of aspect ratio information and an apparatus having a functional feature of coordinately processing pieces of aspect ratio information in order to avoid operation errors of the apparatus.

More specifically, in an aspect of the present invention, there is provided an information processing apparatus for recording and playback video information, the apparatus comprising: a means for assembling video packs, using a first signal including first aspect ratio information; means for assembling a video object unit to be contained in a second signal, using the video packs; and processing means for processing the content of the second aspect ratio information of the second signal according to the content of the first aspect ratio information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Now, the present invention will be described in greater detail by referring to the accompanying drawing that illustrates embodiments of the invention.

Figure 1:
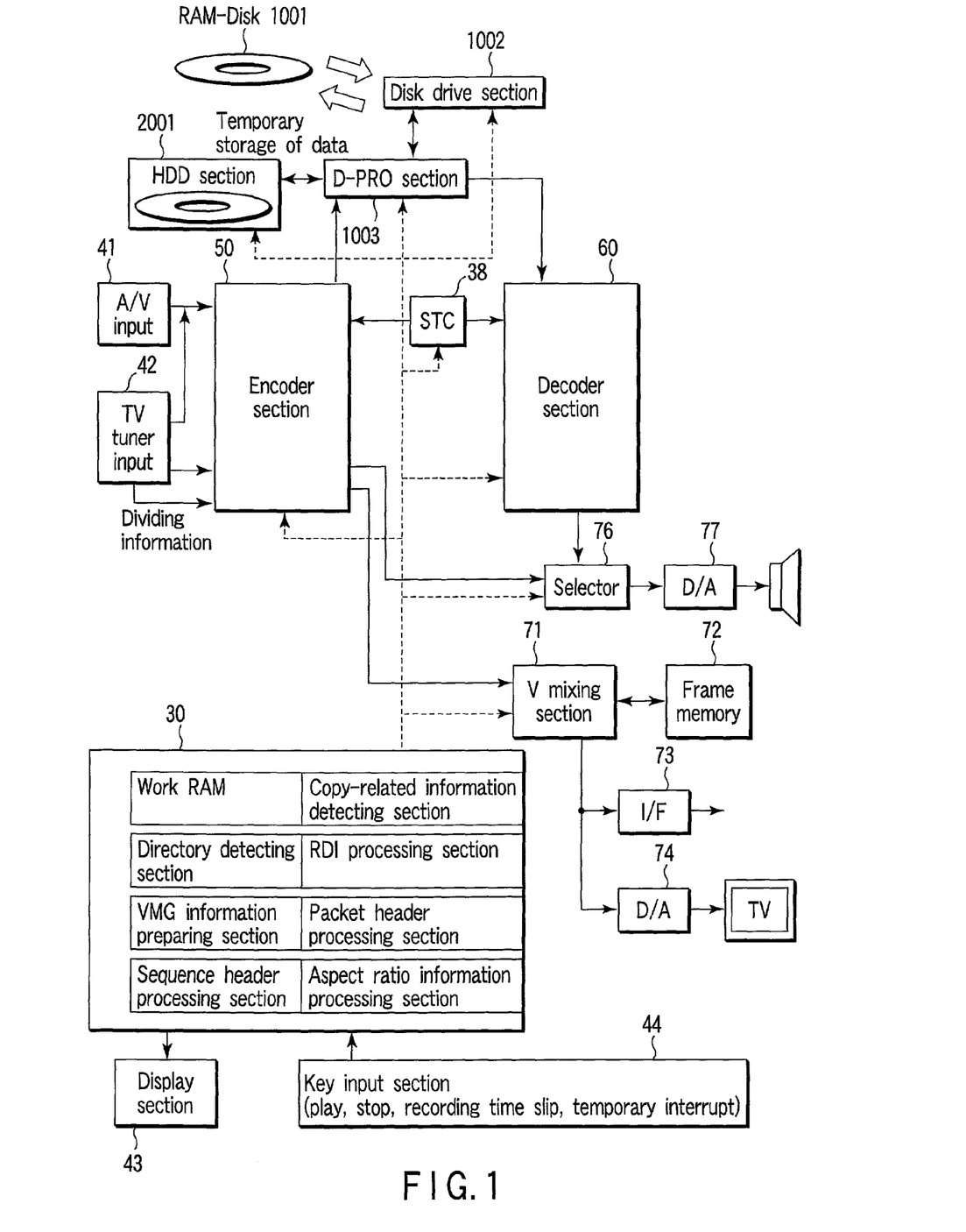
FIG. 1 is a schematic block diagram of an embodiment of information recording/reproducing apparatus according to the invention.

FIG. 1 is a schematic block diagram of an embodiment of the information recording/reproducing apparatus according to the invention. While this embodiment is a recording/reproducing apparatus adapted to handle both DVD-RAMs and hard disks, it may alternatively be so arranged that the embodiment handles only one of the two types of recording medium. Still alternatively, the hard disk or the DVD-RAM may be replaced by a semiconductor memory.

The blocks of FIG. 1 may be divided into those for recording shown on the left side, and those for reproduction, shown on the right side.

This embodiment of an information recording/reproducing apparatus comprises a hard disk drive section 2001, a disk drive section 1002 for driving an optical disk 1001, that performs writing information to the disk 1001 which is adapted to store composed video files, and reading information from the disk 1001, and a data processor section 1003 which is adapted to supply data to be recorded to the hard disk drive section 2001 and the disk drive section 1002, and receives signals reproduced from them. The data processor section 1003 is designed to handle data to be recorded or reproduced on a unit by unit basis and includes a buffer circuit, a modulator/demodulator circuit and an error correction circuit.

This embodiment of a recording/reproducing apparatus further comprises, as major components, an encoder section 50 operating for the image recording side of the apparatus, a decoder section 60 operating for the image reproducing side of the apparatus and a microcomputer block 30 for controlling the overall operation of the apparatus main body.

The encoder section 50 has analog/digital converters for respectively digitizing input analog video signals and input analog audio signals (a first signal), a video encoder and an audio encoder, as well as a sub video encoder (or subpicture encoder), a formatter for formatting the output of each of the encoders into a predetermined DVD-RAM format, and a buffer memory.

The encoder 50 receives external analog video signals and external analog audio signals from an AV input section 41, and analog video signals and analog audio signals from a TV (television) tuner 42.

When the encoder 50 receives digital video and digital audio signals, it forwards them directly to the formatter. It is also adapted to supply video and audio data respectively to a video mixing section and an audio selector, which will be described hereinafter.

The video encoder compresses each digital video signal at a variable bit rate conforming to the MPEG 2 or MPEG 1 Standard. The audio encoder compresses each digital audio signal at a fixed bit rate conforming to the MPEG or AC-3 Standard or converts it into a linear PCM digital audio signal.

When sub video information (e.g., a signal from a DVD video player having an independent output terminal for sub video signals) is input from the AV input section 42 or when a DVD video signal having such a data structure is broadcast and received by the TV tuner 42, the sub video signal in the DVD video signal is encoded (run length coded) by the sub video encoder to produce a bit map for the sub video signal.

The digital video signal, the digital audio signal and the sub video data that are encoded are put into packs by the formatter to produce video packs, audio packs and sub video packs, which are then put together and formatted to conform to a DVD Recording Standard (such as DVD-RAM, Standard, DVD-R or DVD-RW) (a second signal).

In this embodiment of an information recording/reproducing apparatus, the information (video packs, audio packs and sub video packs) encoded by the encoder section 50 and the control information prepared by the latter may be supplied to and stored in the hard disk drive 2001 by way of the data processor 1003. Additionally, the information recorded in the hard disk may be copied or transferred to the optical disk 1001 by way of the data processor 1003 and the disk drive 1002. This is because the information stored in the hard disk and the information stored in the optical disk 1001 have the same data format.

Still additionally, the information encoded by the encoder 50 and the control information prepared by the latter may be directly stored in the optical disk 1001 by way of the data processor 1003 and the disk drive 1002. Furthermore, any of the files or video objects stored in the optical disk 1001 and/or the hard disk may be erased.

It is also possible to partly erase the video objects of a plurality of programs stored in the hard disk and/or the optical disk 1001 and edit some of the video objects of different programs by appropriately combining them and cutting parts of them. This is because, the data unit (which will be described hereinafter) in the data format of the embodiment is defined to ease handle and edit.

If the format of the information stored in the hard disk of the hard disk drive section 2001 is different from the data format of the optical disk 1001, the information read out from the hard disk is encoded by the encoder 50 so that it may be recorded on the optical disk 1001. The disk drive section 1002 has a rotation control system for the optical disk 1001, a laser drive system, an optical system and so on.

The microcomputer block 30 includes an MPU (microprocessing unit) or a CPU (central processing unit), a ROM storing control programs and a RAM to be used for providing work areas necessary for executing programs.

The MPU of the microcomputer block 30 performs operations in accordance with the control programs stored in the ROM such as detecting defective areas and unused storage areas, selecting an area for recording video information, recording UDF and selecting an AV address, utilizing the RAM a work area.

The microcomputer block 30 also includes information processing sections that are required to control the overall system such as a work RAM, a directory detector, a VMG information (overall video management information) generating section, a copy-related information detector section, a copy and scrambling information processing section (RDI processing section), a packet header processing section, a sequence header processing section and an aspect ratio information processing section.

Of the results obtained by a program executing operation of the MPU, those to be notified to the user are displayed on the display section 43 of the DVD video recorder or the display screen of a monitor (OSD, on screen display). The microcomputer block 30 additionally includes a key input section 44 for entering operation signals to be used for operating the apparatus.

The microcomputer block 30 operates to control the disk drive 1002, the data processor 1003, the encoder 50 and/or the decoder 60, and so on at respective timings as determined on the basis of the timing data from the STC 38. While signal recording/reproducing operations are normally conducted in synchronism with the time clock of the STC 38, other processing operations may be carried out independently from the STC 38.

The decoder section 60 has a separator for separating and taking out each pack from a signal of a DVD format having a pack structure, a memory to be used for the operation of separating packs and other signal processing operations, a V decoder for decoding the main video data (the contents of the main video pack) separated by the separator, an SP decoder for decoding the sub picture data (the contents of the sub video pack) separated by the separator and an A decoder for decoding the audio data (the contents of the audio pack) separated by the separator. It additionally has a video processor for appropriately synthetically combining the decoded main video data and the decoded sub video data and outputting a signal for the main image superimposed with a menu, highlighted buttons and/or captions.

The output video signal of the decoder 60 is then input to a video mixer 71, which is adapted to synthesize text data. The video mixer 71 is connected to a line by which signals can be directly taken in from the TV tuner 41 or the A/V input section 42. A frame memory 72 that is used as a buffer is connected to the video mixer 71. When the video mixer 71 outputs a digital signal, it is output externally by way of an interface (I/F) 73. When, on the other hand, the video mixer 71 outputs an analog signal, it is output externally by way of a digital/analog converter 74.

The output audio signal of the decoder section 60 is sent to a digital/analog converter 77 by way of a selector 76 and converted into an analog signal there before it is externally output. The selector 76 is controlled by a selection signal from the microcomputer block 30. Therefore, it is possible to directly monitor the digital signal coming from the TV tuner 41 or the A/V input section 42 through the encoder 50.

The formatter of the encoder 50 prepares section information (e.g., information on GOP head interrupt) during a recording session and periodically transmits it to the microcomputer block 30. Section information may include the number of packs of the VOBU, the end address of the I picture starting from the head of the VOBU and the reproduction time of the VOBU.

At the same time, the information from the aspect information processing section is transmitted to the MPU at the recording start time and the MPU prepares VOB stream information (STI). STI includes resolution data and aspect data and each decoder is initialized on the basis of this information at the time of a signal reproducing operation.

A single video file is stored on a recording/reproducing DVD.

What needs attention when accessing data by means of a real time recording/reproducing apparatus adapted to utilize a DVD is that contiguous sectors are minimally required in order to continue on reproducing data while accessing (seeking) the data to be reproduced. A unit of a contiguous sector is referred to as CDA (contiguous data area), which represents a predefined data size necessary for realizing a seamless reproduction of data.

Advantageously, a CDA is defined on the basis of a unit of ECC (error correction code) block. Therefore, it is preferable that a CDA is made to have a size of a multiple of 16 sectors, and data are recorded by file systems on a CDA by CDA basis. The data processor 1003 receives data from the formatter of the encoder 50 on a VOBU by VOBU basis and feeds the disk drive 1002 with data on a CDA by CDA basis. The MPU of the microcomputer block 30 prepares control information necessary for reproducing recorded data and, upon recognizing a command for completing the data recording session, it transmits the control information it has prepared to the data processor 1003. As a result, the control information is stored in the disk. Therefore, when an encoding operation is being conducted, the MPU of the microcomputer block 30 receives information on the unit of data (sectional information and so on) from the encoder 50. Additionally, when a recording session is started, the MPU of the microcomputer 30 recognizes the control information read out from the disk (file system) and the unused (unrecorded) areas of the disk and specifies data recording areas to be used for the recording session by way of the data processor 1003.

Now, the relationship between the control information of a real time DVD and the video objects that are contents of the DVD will be described below.

Figure 2:
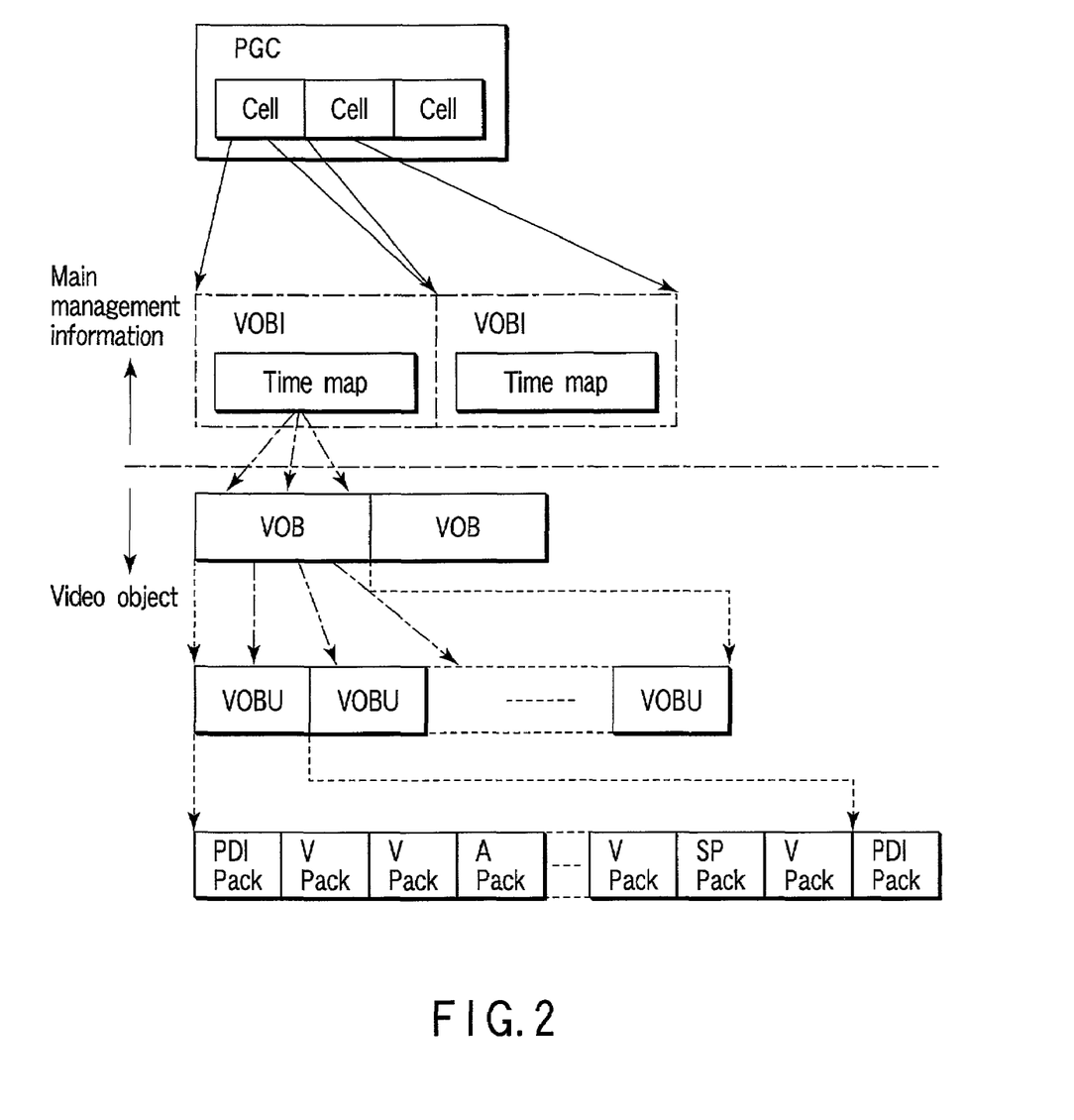
FIG. 2 is a schematic illustration of the data format adopted for DVD-RAMs.

Referring to FIG. 2, firstly a video object (VOB) will be described. A VOB is referred to as VR_MOVIE. VRO file in a directory. Video files have a hierarchical structure and a video file comprises one or more than one VOBs (video objects). Each VOB is formed by one or more than one VOBUs (video object units) and each VOBU is formed by a plurality of packs. The packs may form as RDI packs of unit control information, V (video) packs, A (audio) packs and/or sub video packs (SP packs).

An RDI pack is also referred to as unit control information pack, or navigation information pack, or real time data information pack (RDI_PCK). The pack contains information indicating the time of starting the reproduction of the first field of the VOBU to which the pack belongs, information indicating the time of recording of the VOBU and information on the manufacturer (MNF 1) as well as display control information (DCI) and copy control information (CCI). The display control information includes aspect ratio information, subtitle mode information and film camera mode information. The copy control information (CCI) includes copy authorization information (0, 0) and copy prohibition information (copy non-authorization information (1, 1).

A V pack is formed by compressing video data according to a processing method conforming to MPEG 2 and comprises a pack header, a packet header and a video data section. An A pack is formed by a linear PCM, MPEG or AC3 processing method and comprises a pack header, a packet header and an audio data section.

Control information is also referred to as video manager (VMG) and the program chain (PGC) for controlling the sequence of reproduction of data is defined in it. A cell is defined in the program chain (PGC) and video object information (VOBI) that is information on the video object (VOB) to be reproduced is defined in the cell. Thus, program chain information (PGCI) contains specific information on the PGC. There are two types of PGCI; original PGCI (ORG_PGCI) and user-defined PGC table (UD_PGCIT).

A time map (TMAP) is described in VOBI and can be used to specify the VOBUs that constitute the VOB corresponding to the VOBI. The link from a cell to VOBI is identified by a logical address. The link from TMAP information to a VOB and the VOBUs therein is realized on the basis of the stream number of the VOB, the number of VOBUs in the VOB, the entry number of each of the VOBUs and the logical address to each target VOBU.

Figure 3A:
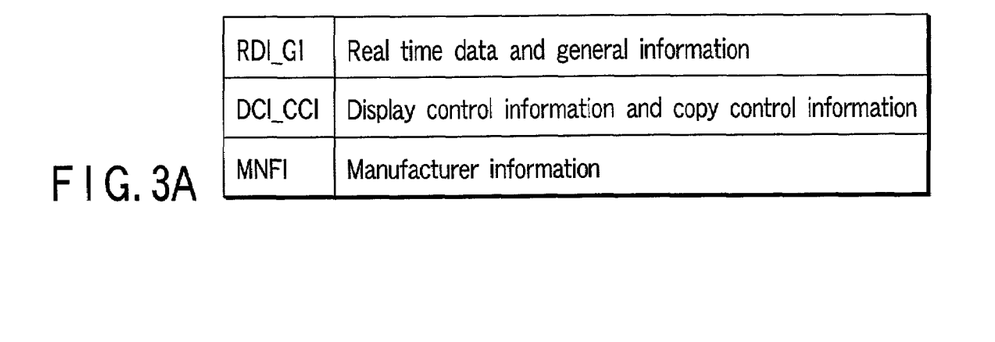
FIGS. 3A through 3D are schematic illustrations of the data structure of real time recording information (RDI) arranged at the head of a video object unit that is adopted for DVD-RAMs.
Figure 3B:
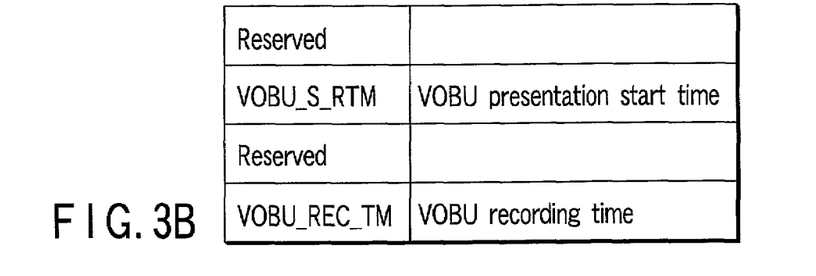
Figure 3C:
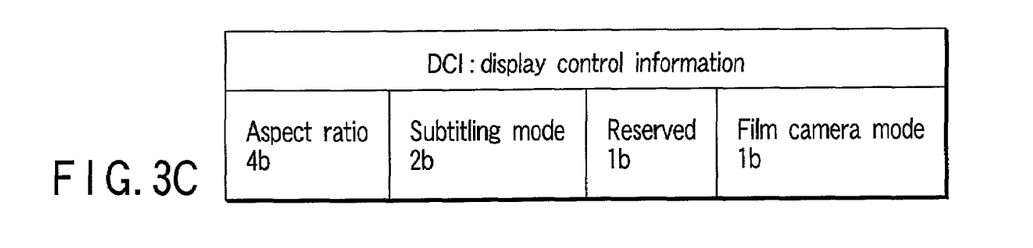

FIG. 3A schematically illustrates the data structure of the real time information (RDI) contained in a real time data information pack (RDI_PCK), which is described above. As shown in FIG. 3B, real time data information (RDI) includes RDI general information (RDI_GI), display control information and copy control information (DCI_CCI) and manufacturer information (MNFI). RDI_GI in turn includes the presentation start time (VOBU_S_PTM) of the first video field of the VOBU to which the RDI belongs and the VOBU recording time (VOBU_REC_T). Finally, as shown in FIG. 3C, display control information (DCI) includes aspect ratio information (of 4 bits), subtitle (caption) information (of 2 bits), reservation-related information (of 1 bit) and information on the film camera mode (of 1 bit).

The four bits of aspect ratio information are 0000 when the video aspect ratio is 4:3 and 0001 when the video aspect ratio is 16:9. They are other than 0000 and 0001 when the source is a letter box. The aspect ratio of a coded video image is 4:3. The two bits of subtitle information are 01 when the subtitle is located within the displayed image and 10 when the subtitle is located outside the displayed image. The one bit of film camera information is 1 for a camera mode and 0 for a film mode.

Figure 3D:
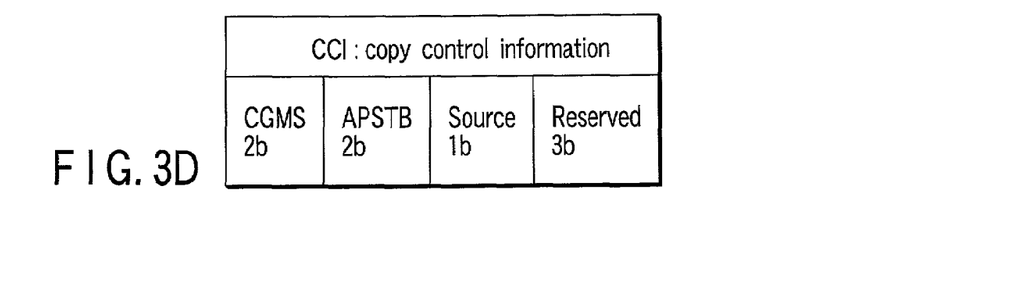

As shown in FIG. 3D, copy control information CCI includes copy generation management system (CGMS) information (of 2 bits). Copying is authorized when the two bits are 00 and prohibited (not-authorized) when they are 11.

Figure 4:
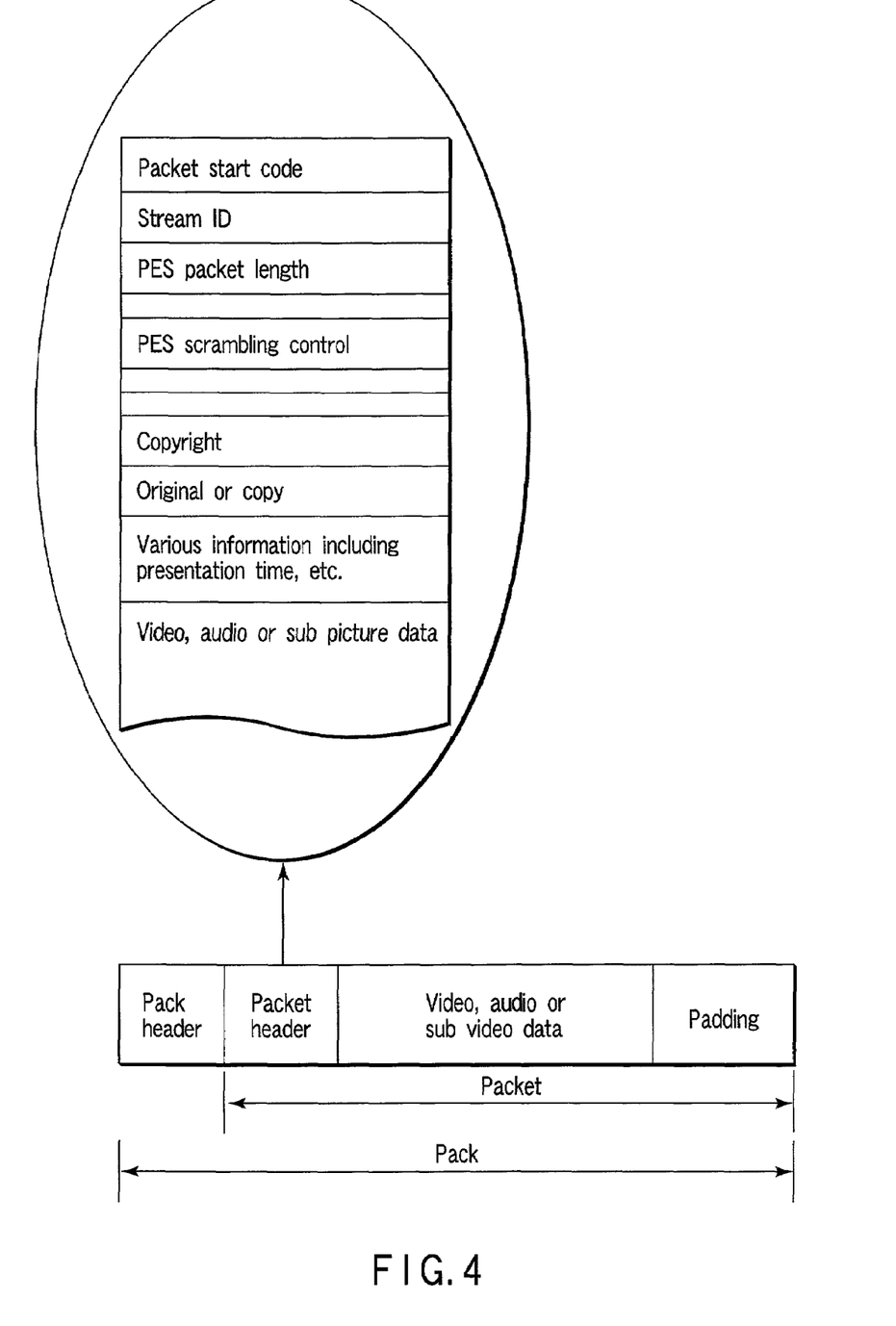
FIG. 4 is a schematic illustration of the information contained in the packet header of a video packet, an audio packet or a sub video packet as defined in the DVD Standard.

FIG. 4 is a schematic illustration of the information contained in the packet header of a video pack, an audio pack or a sub video pack as defined in the DVD Standard (second signal). A pack has a pack header. The pack header describes the system clock reference. The system clock reference is compared with the system clock in the apparatus and the obtained result is used as timing information when handling information on a pack by pack basis in the apparatus. A packet header is arranged behind the pack header and followed by video data, audio data or sub video data.

In the packet header, a stream ID for identity information of packet start code, video stream, and sub video stream is described.

The packet header can be used to describe PES (packet elementary stream) scrambling control information (that indicates if the pack is basically scrambled or not), copyright information and information indicating if the video is original or copied. It additionally describes presentation time information (time stamp) for synchronizing the related streams (video stream, audio stream and sub video stream) that are output simultaneously.

FIGS. 5A through 5D are schematic illustrations of the data structure that can be used for the copy generation management system currently in effect for broadcast signals, that especially describes SGMS.

Normally, a data referred to as VBID is put into the vertical blanking period (VBI) of a broadcast video signal (first signal) for multiplexing.

The VBID is used as information indicating the type of the multiplexed video signal. The types of broadcast signal and information include the following.

(a) squeeze signal (or full mode signal)→a signal obtained by laying a video signal for 525 lines and aspect ratio 16:9 on a standard television signal for 525 lines and aspect ratio 4:3.

(b) letter box signal with aspect ratio 4:3→a wide image signal for 525 lines and aspect ratio 4:3 with non-image areas at the top and bottom and a main image area at the center.

(c) 3D information->information on the signal format for displaying three-dimensional images (d) pull-down information->information to be used when converting a picture with 24 frames per second or a CM film with 30 frames per second into a video signal in order to identify images coming from a same frame.

(e) starting point information→one or more than one pieces of information to be used as index for reproducing an image by means of a VTR machine.

The VBID is put on the 20th or 283rd line. When the first two bits of the first (4-bit) word (referred to as word 0) of the VBID are 00, they signify an image with aspect ratio 4:3 or no information. When they are 10, they signify a squeeze signal of an image with aspect ratio 16:9. When they are 01, they signify a letter box signal with aspect ratio 4:3. When they are 11, they do not signify anything.

Therefore, it is possible to detect the aspect ratio of a video signal by detecting the first two bits of word 0 of the VBID of the signal.

However, it should be noted that, when the four bits (word 1) located immediately after word 0 (2 bits) are all 0s, they signify that the VBDI is used as CGMS information.

Now, CGMS information will be described below. CGMS information is inserted in the 20th horizontal period in a vertical blanking period of a television signal (see FIG. 5A). It is information of 20 bits (see FIG. 5B). The first and second bits are used as word 0 and the next four bits from the third bit to the sixth bit are used as word 1 and equal to 0000, indicating that copy generation control information is found next. The bits from the seventh bit to the fourteenth bits are used as word 2 and the remaining bits from the fifteenth bit to the twentieth bit are used as CRCC, or error correction code.

Figure 5A:
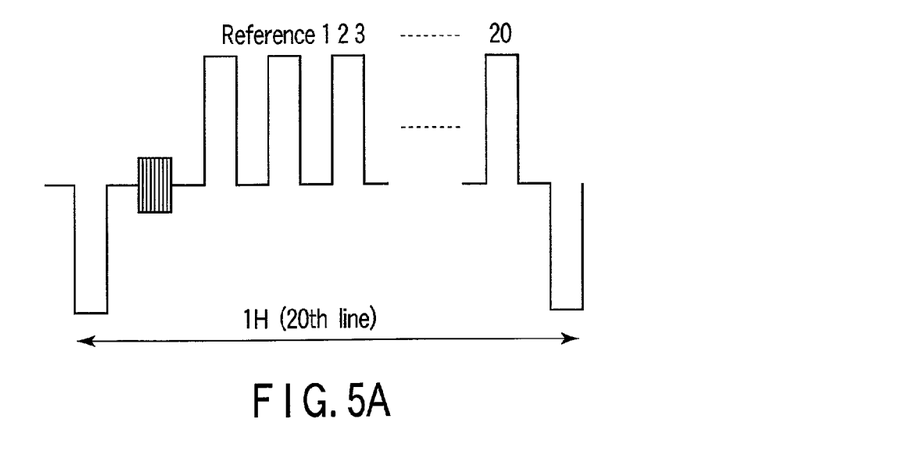
FIGS. 5A through 5D are schematic illustrations of the information that can be inserted into a vertical blanking period of a television signal.
Figure 5B:
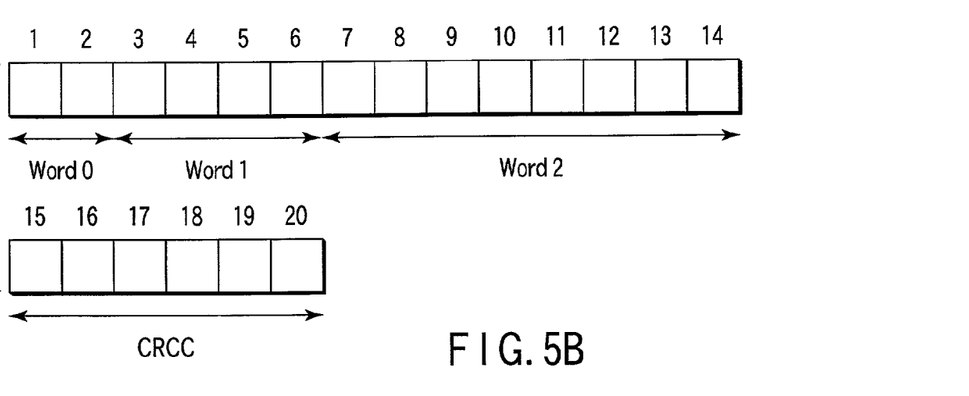
Figure 5C:
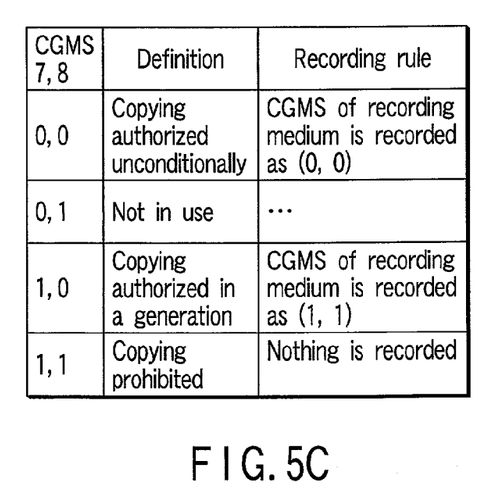

The two bits including the seventh and eighth bits represent a CGMS data, which is defined in a manner as shown in FIG. 5C. When the two bits are 0, 0, they signify that the video signal can be copied without restrictions. When the two bits are 1, 0, they signify that the video signal can be copied only for a generation. Finally, when the two bits are 1, 1, they signify that copying the video signal is prohibited.

Thus, the recording apparatus operates in a manner as shown in FIG. 5C when recording the video on a recording medium by referring to the CGMS information. More specifically, when the seventh and eighth bits are 0, 0 (to authorize any copying operation), the contents of the CGMS information shown in FIG. 3D are made equal to 0, 0 (copy authorizing information). When the seventh and eighth bits are 1, 0 (to authorize copying operation only for a generation) or 1, 1 (to prohibit any copying operation), contents of the CGMS information in the RDI shown in FIG. 3D are made equal to 1, 1 (copy prohibiting information). Additionally, the scrambling control information of each of the packet headers in the VOBU having the RDI at the head thereof is made same as the contents of the CGMS information in the RDI.

Figure 5D:
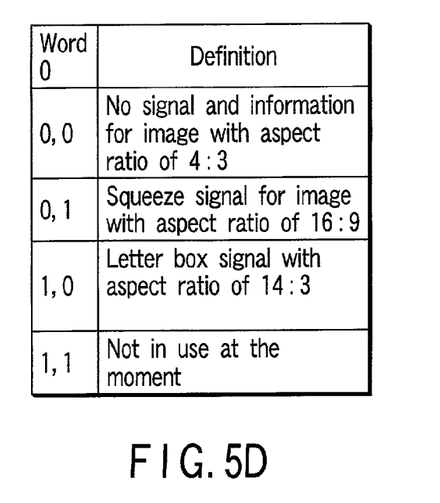

Additionally, as described above, normally with television signals, the two bits of word 0 are used as aspect ratio information of the transmitted TV signal. FIG. 5D shows the definition of the two bits of the word 0. As shown in FIG. 5D, 0, 0 is used for a video signal with an aspect ratio of 3:4 or no information and 1, 0 is used for an image squeeze signal with an aspect ratio of 16:9, while 0, 1 is used for a letter box signal with an aspect ratio of 4:3 and 1, 1 is not used.

Thus, this embodiment of a recording/reproducing apparatus adapted to process such an input television signal operates according to the definition of FIG. 5D and records the corresponding video signal on a recording medium by referring to the CGMS information. More specifically, it makes the aspect ratio information contained in the DCI in the RDI identical to the aspect ratio information contained in the CGMS information. Then, contents of the aspect ratio information in the sequence header of the compressed video signal conforming to the MPEG Standards and contained in the VOBU where the RDI is arranged at the head is made to properly correspond to the contents of the aspect ratio information in the DCI.

Figure 6:
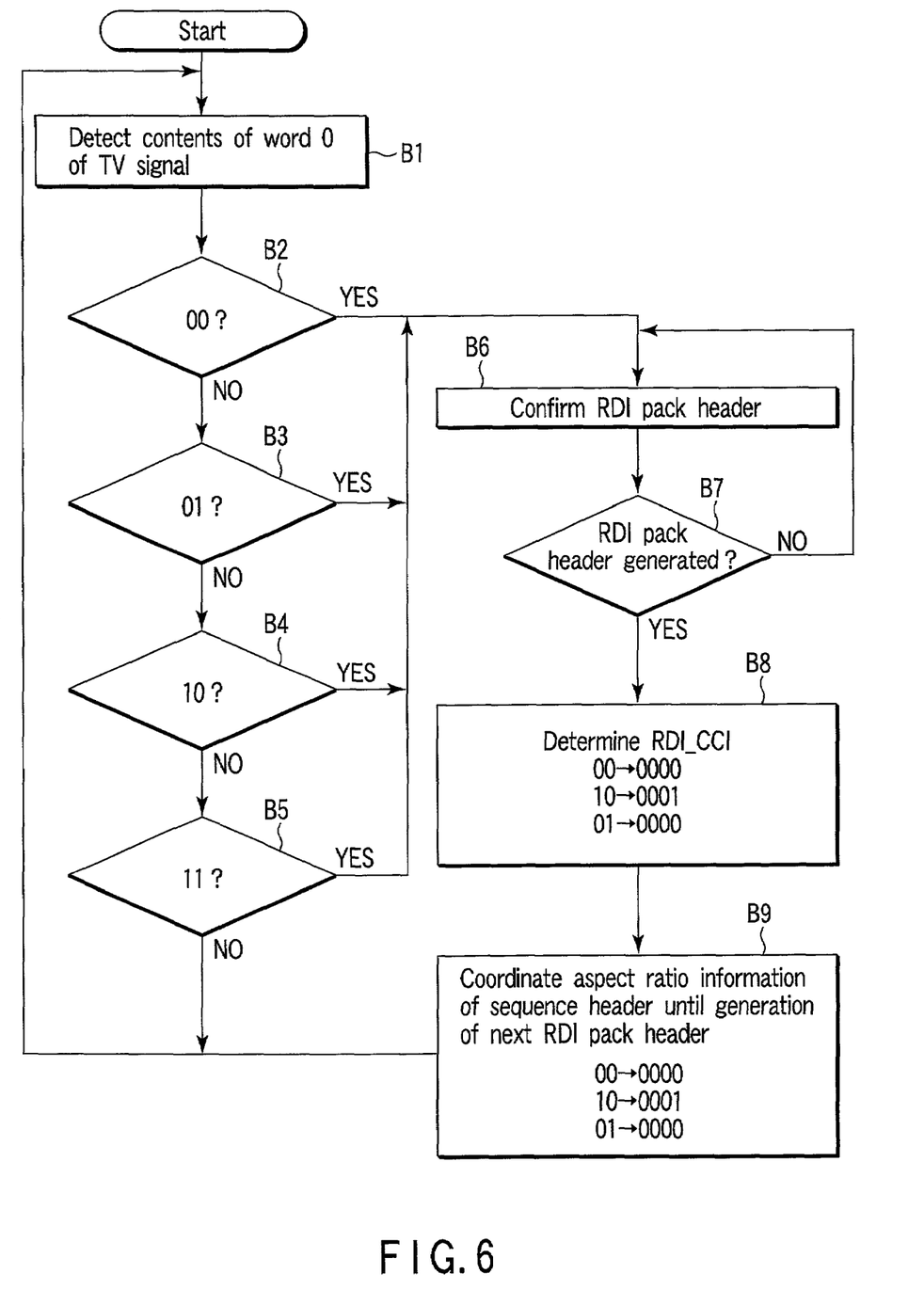
FIG. 6 is a flow chart of the aspect ratio information processing operation of the embodiment of information recording/reproducing apparatus according to the invention.

FIG. 6 is a flow chart of an operation of coordinating aspect ratio information in the RDI and (see FIG. 3C) and the aspect ratio information contained in the sequence header of the compressed video signal by referring to the above described aspect ratio information in the input video signal.

The program for this processing procedure is set in the microcomputer block 30 shown in FIG. 1. Referring to FIG. 6, the data (CGMS information) inserted into a specific horizontal period of a vertical blocking period is received from the externally input television signal (Step B1). Then, the contents of the aspect ratio information as described above is determined (Step B2, B3, B4, B5). The aspect ratio information is temporarily stored. Then, it is checked if the encoding operation is progressing and an RDI pack is generated by the formatter or not (Step B6). When an RDI pack is identified (Step B7), the aspect ratio information of the DCI in the RDI pack is modified to adapt it to the contents of the temporarily-stored aspect ratio information (Step B8). This modifying operation is conducted on the principle as described above by referring to FIG. 8C.

More specifically, when the CGMS information of the input source is determined to be 0, 0, this refers to a signal of an image with an aspect ratio of 4:3 and hence the aspect ratio information of the RDI is set to 0, 0, 0, 0. When the CGMS information of the input source is determined to be 1, 0, this refers to a signal of an image with an aspect ratio of 16:9 and hence the aspect ratio information of the RDI is set to 0, 0, 0, 1. Likewise, when the CGMS information of the input source is determined to be 0, 1, this refers to a letter box signal of an image with an aspect ratio of 4:3 and hence the aspect ratio information of the RDI is basically set to 0, 0, 0, 0.

Additionally, the aspect ratio information in a sequence header of the video pack in the VOBU containing the RDI is coordinated as in the case of the RDI (Step B9). This processing operation is conducted for all the video packs in the VOBU until the next RDI pack is found for coordinating (making coincidence) the copy control information and the scrambling control information.

Figure 7:
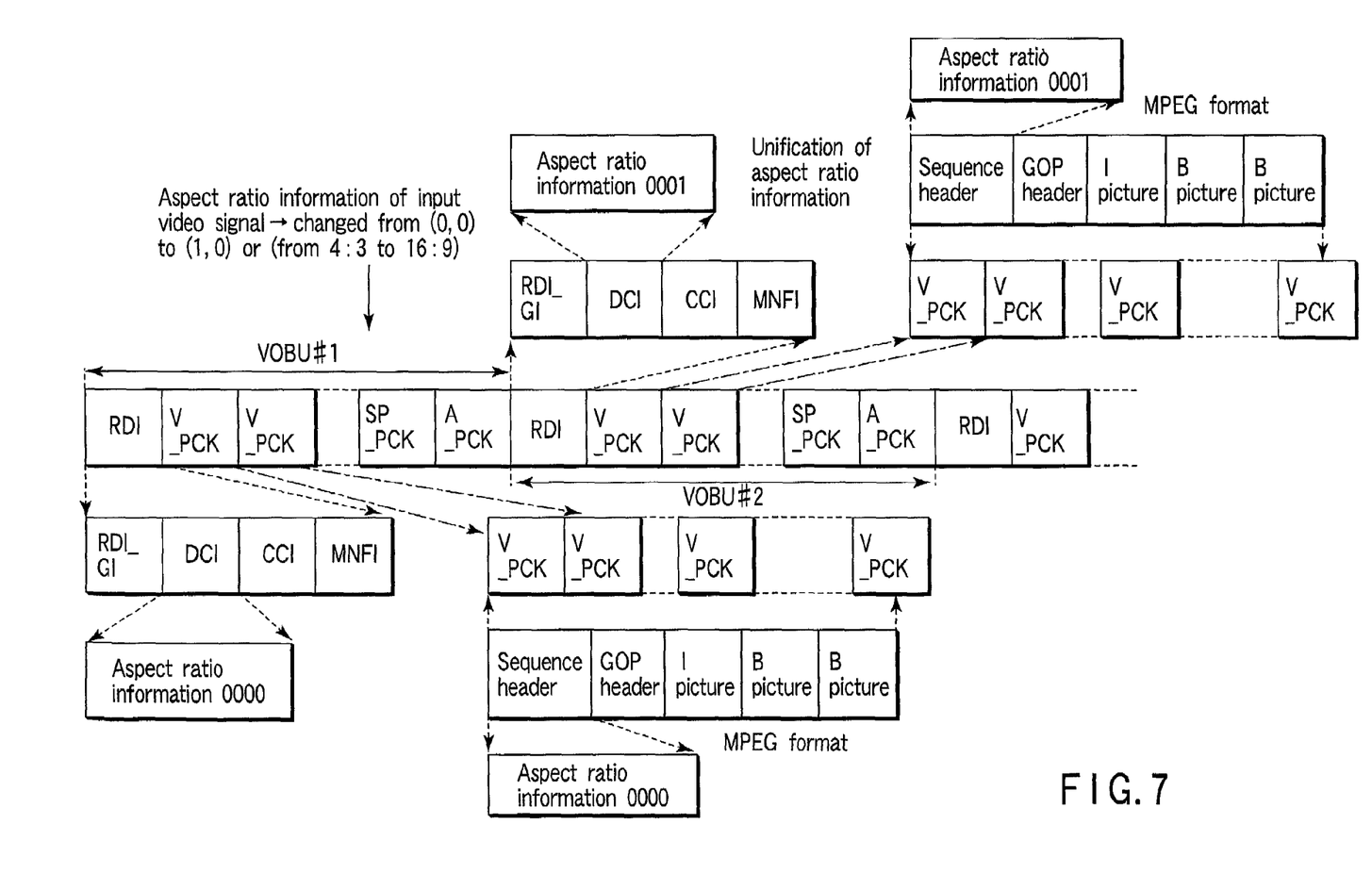
FIG. 7 is a schematic illustration of the progress with time of a processing operation for rewriting the aspect ratio information of a video object conducted by following the sequence shown in the flow chart of the aspect ratio information processing operation shown in FIG. 6.

FIG. 7 is a schematic illustration of the progress with time of a processing operation for formatting and rearranging video information by means of the formatter in the encoder 50 shown in FIG. 1. In the case of video packs (V_PACK) to be combined together according to the MPEG Standards, the data section of each video pack comprises a sequence header, a GOP header, a compressed I picture and a compressed B picture.

Assume here that the aspect ratio information of the leading RDI pack of the first VOBU, or VOBU #1, is 0, 0 and the aspect ratio information of the sequence header of the compressed video signal contained in the VOBU #1 is also made to be equal to 0, 0, 0, 0. Also assume that the CGMS information of the video signal input to the encoder 50 is changed to 1, 0 or 1, 1 in the course of the operation of processing the VOBU #1. Then, the copy and scrambling information processing section of this embodiment detects the change in the CGMS information. Thereafter, the contents of the CGMS information in the RDI located at the head of the next VOB, or VOBU #2, is made to be equal to 0, 0, 0, 1 (16:9) when generating the VOBU #2. The aspect ratio information of all the subsequent sequence headers is also made to be equal to 0, 0, 0, 1.

While the aspect ratio information of the RDI is basically set to 0, 0, 0, 0 when the word 0 information of the input source is determined to be 0, 0 (indicating an aspect ratio of 4:3), whereas the aspect ratio information of the RDI is set to 0, 0, 0, 1 when the information of the input source is determined to be 1, 0 (indicating an aspect ratio of 16:9) in the above description, the aspect ratio information may be defined in a more detailed way by the user who is monitoring the operation. For example, values such as 1000, 0100, 1101, 0010, 1011, 0111 may be used in the case of a letter box. In this case again, the aspect ratio information of the sequence header of the video data compressed according to the MPEG Standard and the aspect ratio information of the corresponding RDI are made to be same and identical relative to each other.

As described above, copy control information and aspect ratio information are coordinated (or coincidence) on a video object by video object basis. Therefore, in the case where the method and apparatus according to the invention are dedicated to signal reproduction, the aspect ratio of the decoded and output video signal of the video object unit to which a video pack belongs may be determined solely depending on the contents of the aspect ratio information of the sequence header to simplify the information judging function of the entire apparatus. It should be appreciated that the same is true for judging copy authorization/prohibition information.

The general concept of the present invention is not limited to the above described embodiment.

In the above described embodiment, the copy control information in the unit control information (RDI) and the scrambling control information in the packet header are coordinated in order to coordinate different pieces of copy-related information. Similarly, the aspect ratio information in the unit control information (RDI) and the aspect ratio information in the sequence header are coordinated in order to coordinate different pieces of aspect ratio information.

However, according to the DVD Recording Standard, copy-related information and aspect ratio information are found also in control information on a VOB unit basis (M_VOB_STI:movie video object stream information) and control information for controlling an entire video file (attribute information in the file system).

Therefore, an embodiment having the functional features of the first embodiment and additionally adapted to coordinate copy-related information and aspect ratio information on a VOB unit basis will be discussed below.

Figure 8:
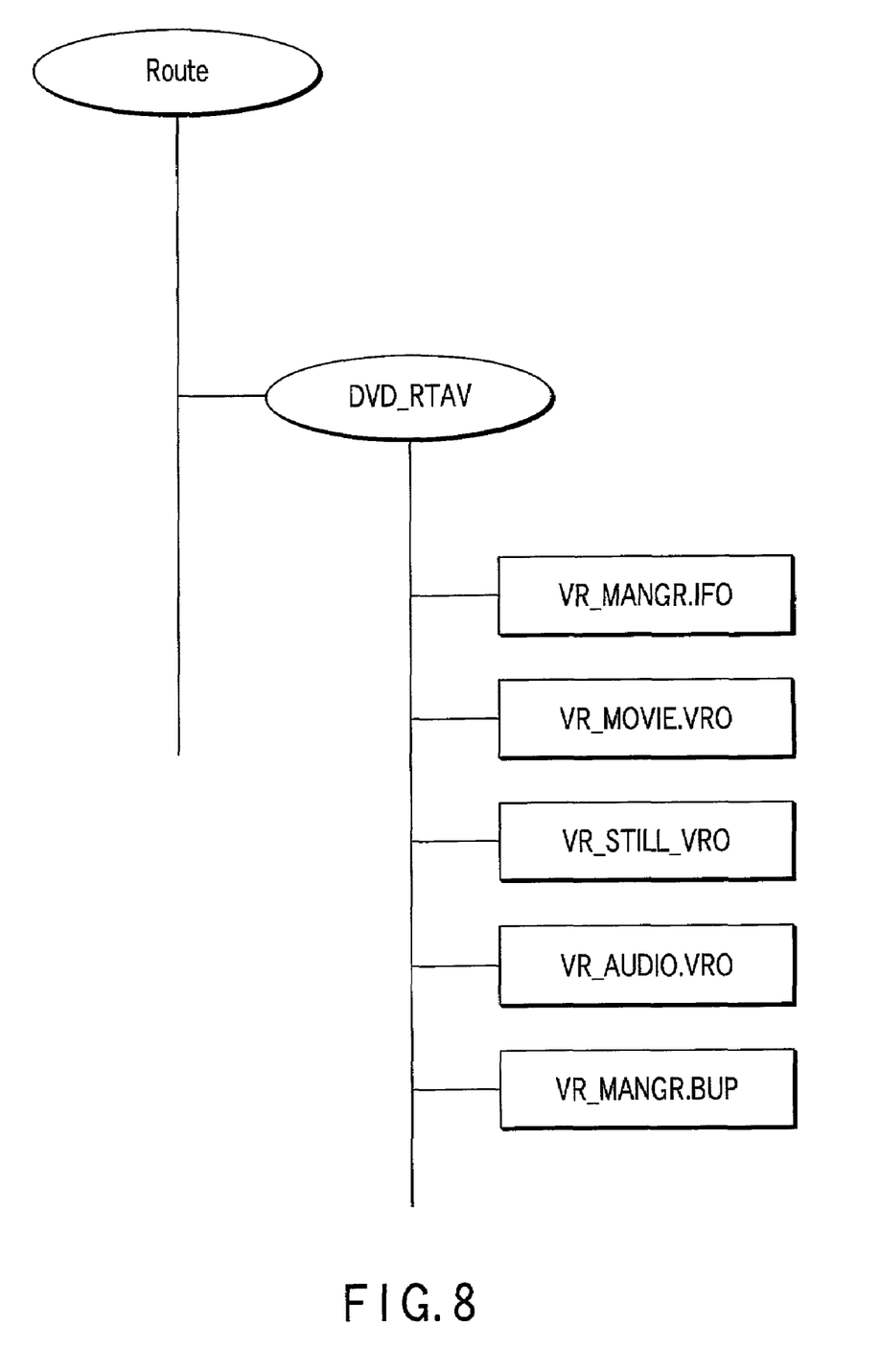
FIG. 8 is a schematic illustration of the directory structure in a DVD system.

Referring to FIG. 8, in a DVD system, information for controlling video information of a disk and information for controlling the titles in the video information are unified and defined as video manager information (VMGI).

In the directory "DVD_RTAV", there are video manager file VR_MANGR. IFO, movie video file VR_MOVIE. VRO, still picture video file VR_STILL. VRO, annexed audio file VR_AUDIO. VRO and video manager back up file VR_MANGR. BUP.

The VR_MANGR. IFO is used to store navigation data for controlling program sets, programs, entry points, play lists and so on.

The VR_MOVIE. VRO is a movie AV file for storing movie video objects (movie VOBs).

The VR_STILL. VRO is a still picture AV file for storing still picture VOBs.

The VR_AUDIO. VRO is a still picture annexed audio file for storing the audio streams annexed to still pictures.

The VR_MOVIE. VRO is used to store original VOBs constituted by video parts containing arbitrarily selected sub-picture units. The original VOBs may include audio parts related to the video parts.

The VR_AUDIO. VROS is used to store annexed audio parts, which indicate the audio streams recorded by after-recording operations. The audio parts recorded in the VR_AUDIO. VRO are combined with several video parts stored in the VR_STILL. VRO. The VR_MANGR. BUP is a backup file of the VR_MANGR. IFO.

The disk is managed on a file unit basis and the information of each file is described in an area provided with a logical block number on the disk. The logical block numbers (LBN) start with a logical sector number (LSN) that refers to a physical address on the disk, for instance the 8576-th logical sector number.

Figure 9:
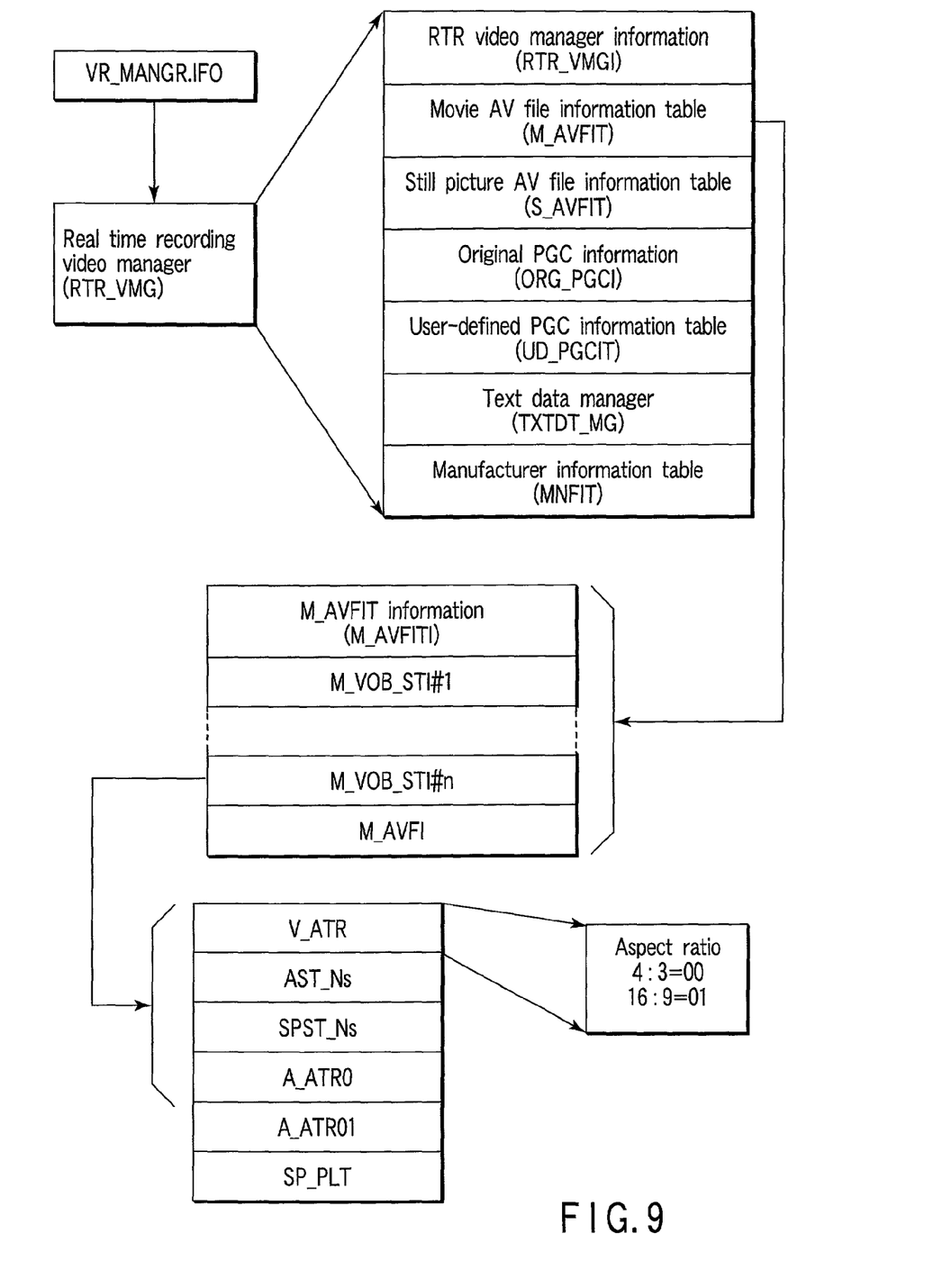
FIG. 9 is a schematic and hierarchical illustration of the data structure of a real time recording manager confirming to the DVD recording Standard, showing the video attributes thereof in particular.

FIG. 9 is a schematic and hierarchical illustration of the data structure of management information (to be referred to as navigation data to be used for recording/reproducing video and audio data) that is controlled in the file VR_MANGR. IFO. The management information includes a real time recording video manager (RTR_VMG) containing RTR manager video information (RTR_VMGI), a movie AV file information table (M_AVFIT), a still picture AV file information table (S_AVFIT), original PGC information (ORG_PGCI), a user-defined PGC information table (UD_PGCIT), a text data manager (TXTDT_MG) and a manufacturer information table (MNFIT).

The RTR_VMGI describes the identifier of the manager, the start and end addresses of the manager, version information, the time zone to be used for specifying the time when the disk is used, the still time for specifying the time when a still picture is displayed at the end of a data reproducing operation, character code information to be used as text information, a resume marker to be used for indicating the interrupted position when a data reproducing operation is interrupted, information on the symbol image of the disk, information on the symbol name of the disk and so on.

The M_AVFIT describes M_AVFIT information, the movie video object stream information of each stream (M_VOB_STI #1 through #n) and movie AV file information (M_AVFI). These are used as video object control information.

The M_AVFIT information contains the number of M_VOB_STIs. The M_VOB_STI contains the video attributes of the VOBs (V_ATR), the number of audio streams (AST_Ns) and so on. The V_ATR may include a description of aspect ratio information.

Thus, it is possible to control aspect ratio information on a video object by video object (VOB) basis. A VOB may contain a plurality of VOBUs.

Therefore, this invention is provided with a means for coordinating the aspect ratio information on a VOB by VOB basis and the aspect ratio information on a VOBU by VOBU basis. The flow of the coordinating operation will be described below.

Figure 10:
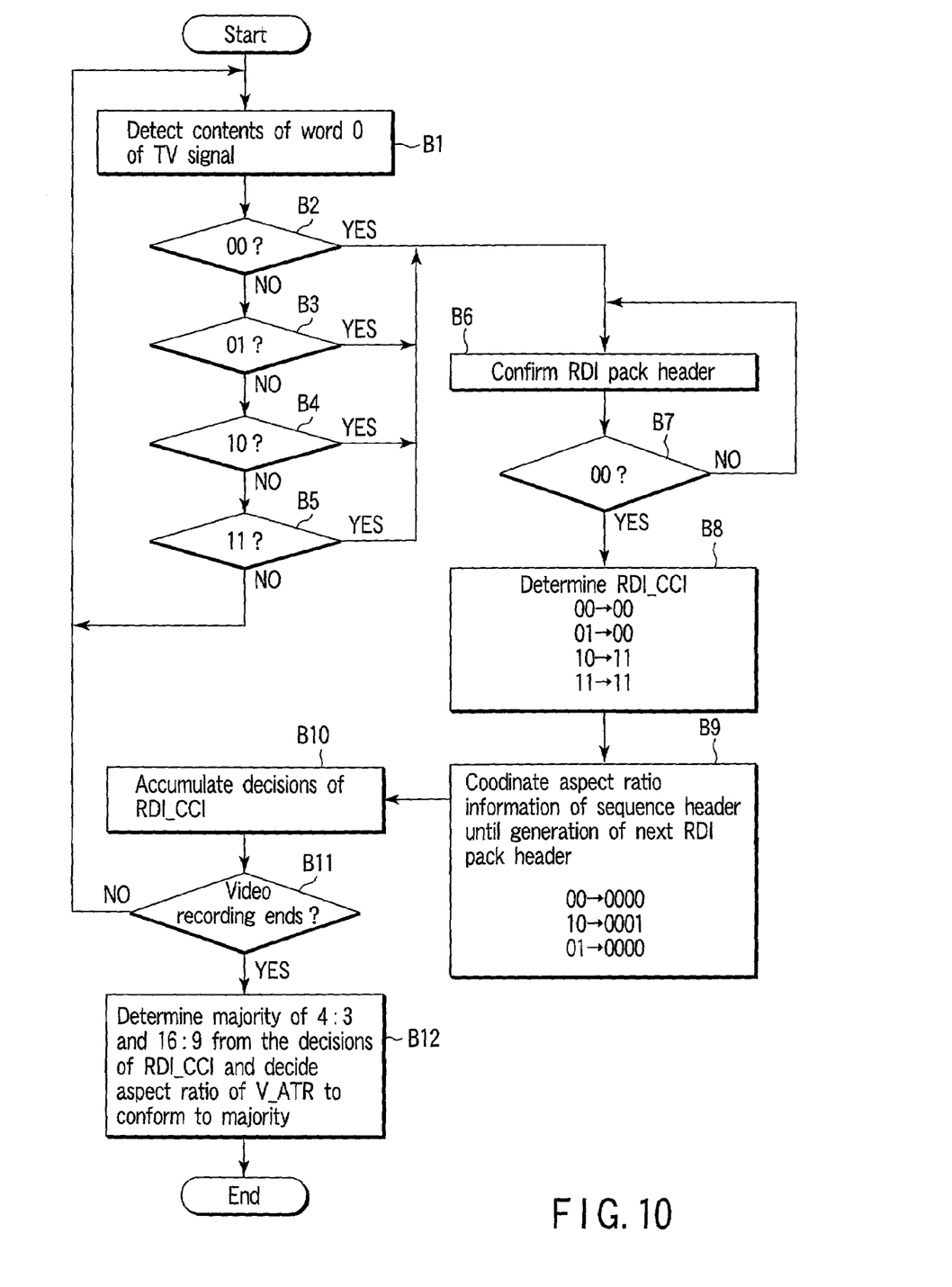
FIG. 10 is another operation of processing the information on the aspect ratio that is conducted by an apparatus according to the invention.

FIG. 10 is a flow chart of the operation of another means for coordinating different pieces of aspect ratio information. In FIG. 10, the steps down to Step B9 are identical with the counterparts of FIG. 6.

The data inserted into a specific horizontal period of a vertical blocking period is received in from the externally input television signal (Step B1). Then, the contents of the aspect ratio information as described above are determined (Step B2, B3, B4, B5). The aspect ratio information is temporarily stored. Then, it is checked if the encoding operation is progressing and an RDI pack is generated by the formatter or not (Step B6). When, an RDI pack is identified (Step B7), the aspect ratio information of the DCI in the RDI pack is modified to adapt it to the contents of the temporarily stored aspect ratio information (Step B8). This modifying operation is conducted on the principle as described above by referring to FIG. 5C.

More specifically, when the word 0 information of the input source is determined to be 0, 0, this refers to a signal of an image with an aspect ratio of 4:3 and hence the aspect ratio information of the RDI is set to 0, 0, 0, 0. When the information of the input source is determined to be 1, 0, this refers to a signal of an image with an aspect ratio of 16:4 and hence the aspect ratio information of the RDI is set to 0, 0, 0, 1. Likewise, when the information of the input source is determined to be 0, 1, this refers to a letter box signal of an image with an aspect ratio of 4:3 and hence the aspect ratio information of the RDI is basically set to 0, 0, 0, 0.

Additionally, the aspect ratio information in the sequence header of the video pack in the VOBU containing the RDI is coordinated as in the case of the RDI (Step B9). This processing operation is conducted for all the video packs in the VOBU until the next RDI pack is found for coordinating the copy control information and the scrambling control information.

Then, with this embodiment, the contents of the RDI_CCI as determined in Step B8 are counted on a VOBU by VOBU basis and stored. More specifically, the number of VOBUs (or RDIs) for which the aspect ratio 4:3 is selected and the number of VOBUs for which the aspect ratio of 16:9 is selected are respectively stored (Step B10). Thereafter, in Step B11, it is determined if the video recording operation is terminated (or the preselected automatic video recording operation is terminated) or not. If the operation is not terminated, the processing operation returns to Step A1. If, on the other hand, the operation is terminated, it is determined which of the number of VOBUs for which the aspect ratio of 4:3 is selected and the number of VOBUs for which the aspect ratio of 16:9 is selected is greater (Step B11).

If the number of VOBUs for which the aspect ratio of 4:3 is selected is greater, 00 representing the aspect ratio of 4:3 is described in the V_ATR. If, on the other hand, the number of VOBUs for which the aspect ratio of 16:9 is selected is greater, 01 representing the aspect ratio of 16:9 is described in the V_ATR.

In this way, aspect ratio information can be controlled on a VOBU by VOBU basis.

As described above, according to the embodiments, the contents of the aspect ratio information described in a predetermined area (RDI) specified by the DVD format and those of the aspect ratio information described in a predetermined area (sequence header) specified by the MPEG_PES format are coordinated relative to the contents of the aspect ratio information contained in the input source to prevent the apparatus from committing operation errors.

The above described embodiments of method of coordinately processing pieces of copy information and those of information recording/reproducing apparatus according to the embodiments will be summarized below.

As units of information, a compressed video data having sequence headers containing aspect ratio information (first aspect ratio information) is stored in a distributed way and a video pack containing a plurality of packets having respective annexed packet headers, an audio pack containing compressed audio information and audio scrambling information of each packet, a unit control information pack (RDI) containing aspect ratio information (second aspect ratio information) so as to be used as management information, a video object unit (VOBU) containing a plurality of video packs and a plurality of audio packs with a unit control information pack (RDI) arranged at the head and a video object (VOB) containing one or more than one video object units are defined.

The video decoder generates video packs out of an input source. The audio decoder generates audio packs out of the input source. The formatter generates video object units. The control section detects the aspect ratio information (third aspect ratio information) contained in said input source and rearranges the second aspect ratio information in each unit control pack so as to make it correspond to the contents of the detected third aspect ratio related information when forming video object units. The control section also rearranges the contents of the first aspect ratio information annexed to all the video packs in each video object unit having the rearranged second aspect ratio information at the head so as to make it correspond to the detected third aspect ratio information.

The above embodiments may be summarily described in the following manner.

Video packs are generated from the input source. Audio packs are generated from the input source. They detect the aspect ratio information (third aspect ratio information) contained in said input source and rearranges the second aspect ratio information in each unit control pack so as to make it correspond to the contents of the detected third aspect ratio related information when forming video object units. They also rearrange the contents of the first aspect ratio information annexed to all the video packs in each video object unit having the rearranged second aspect ratio information at the head so as to make it correspond to the detected third aspect ratio information.

As for reproduction of data, the above embodiments may be summarily described in the following way. They specify the aspect ratio of the encoded output of the video data in the video objects having a sequence header by referring solely to the aspect ratio information contained in the sequence header.

In terms of reproduction apparatus and reproduction method, the above embodiments may be summarily described in the following way. The first control section detects the aspect ratio information (third aspect ratio information) contained in said input source and rearranges the second aspect ratio information in each unit control pack so as to make it correspond to the contents of the detected third aspect ratio related information when forming video object units. The first control section also rearranges the contents of the first aspect ratio information annexed to all the video packs in each video object unit having the rearranged second aspect ratio information at the head so as to make it correspond to the detected third aspect ratio information.

The video object control section controls video objects formed by assembling a plurality of video object units. The judging section determines if the number of pieces of aspect ratio information indicating the aspect ratio of 4:3 is greater than the number of pieces of aspect ratio information indicating the aspect ratio of 16:9 or not in each of a plurality of unit control information packs. The second control section rearranges the aspect ratio information in the object control information so as to make it reflects the judgment of the judging section on which of the numbers is greater.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information recording/reproducing apparatus for recording and reproducing video information, wherein said video information is adapted to an information processing data format that is defined to include (1) video packs of which data is configured by a sequence header containing first aspect ratio information and compressed video data, each of the video packs having a packet header, (2) audio packs of which data is audio information, (3) unit control information packs as managing information including second aspect ratio information, (4) a video object unit including a unit control information pack at the head and including the video packs and audio packs continuing to the unit control information pack, (5) and a video object including the video object unit, the apparatus comprising:

an encoder including a video encoder, an audio encoder and a formatter and configured to assemble the video packs, the audio packs and the video object unit; and a controller including a sequence header processing section and an aspect ratio information processing section, and configured to coordinate content of the aspect ratio information in the video object unit, by detecting a third aspect ratio information from the input source, changing the content of the second aspect ratio information in a unit control information pack to the corresponding content with the detected third aspect ratio information, and changing the content of first aspect ratio information in the sequence header in the video packs belonging to the video object unit.

2. An apparatus according to claim 1, further comprising:
video object management means for managing the video object, which includes a plurality of video object units;

majority determining means for determining which aspect ratio information, 4:3 or 16:9, appears more often in a plurality of unit control information, when the video object management means prepares object management information; and a second controller configured to set the aspect ratio information in the object management information such that the aspect ratio information agrees to a determination result obtained by the second controller.

3. An information recording/reproducing method for recording and reproducing video information, wherein the video information is adapted to an information processing data format that is defined to include (1) video packs of which data is configured by a sequence header containing first aspect ratio information and compressed video data, each of the video packs having a packet header, (2) audio packs of which data is audio information, (3) unit control information packs as managing information including second aspect ratio information, (4) a video object unit including a unit control information pack at the head and including the video packs and audio packs continuing to the unit control information pack, (5) and a video object including the video object unit, the method comprising:

generating the video pack from an input source;
generating the audio pack from the input source;
generating the video object unit from the input source;
detecting third aspect ratio information from the input source when the video object unit is formed, and replacing the second aspect ratio information included in the unit control information pack with the detected third aspect ratio information; and
changing contents of the first aspect ratio information of all video packs that are contained in the video object unit having the second aspect ratio information in the head thereof such that the contents are changed to contents related to the third aspect ratio information.

4. An information recording/reproducing method for recording and reproducing video information, wherein the video information is adapted to an information processing data format that is defined to include (1) video packs of which data is configured by a sequence header containing first aspect ratio information and compressed video data, each of the video packs having a packet header, (2) audio packs of which data is audio information, (3) unit control information packs as managing information including second aspect ratio information, (4) a video object unit including a unit control information pack at the head and including the video packs and audio packs continuing to the unit control information pack, (5) and a video object including the video object unit, in a recording mode, the method comprising:
detecting third aspect ratio information from the input source when the video data of the input source is compressed to generate the video pack and the video object unit, and changing the content of the second aspect ratio information in the unit control information pack to the corresponding content with the detected third aspect ratio information;
changing the content of first aspect ratio information in the sequence header in the video packs belonging to the video object unit having the second aspect ratio information in the header to contents related to the third aspect ratio information; and
recording the video object unit in the recording medium,
in a reproducing mode, the method comprising:
referring only to the aspect ratio information contained in the sequence header, and setting the aspect ratio of an encoder output of video data contained in the video object unit, to which the sequence header belongs.

* * * * *